J. H. COULT.
GRASS CATCHER.
APPLICATION FILED AUG. 10, 1907.
921,804.
Patented May 18, 1909.
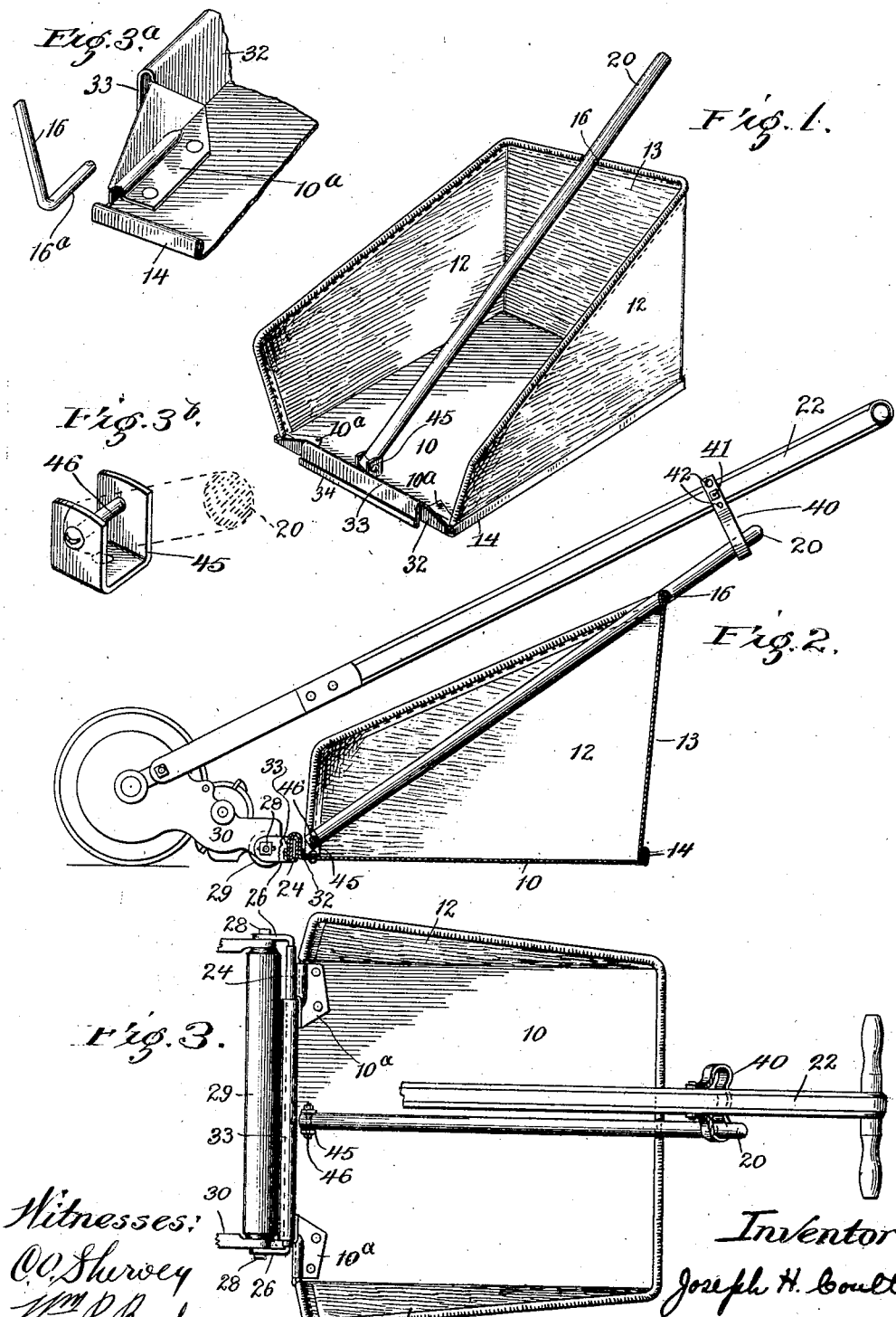
Witnesses:
O. C. Shurvey
W. P. Bond
Inventor:
Joseph H. Coult.
by Fred Gerlach
his Atty

UNITED STATES PATENT OFFICE.

JOSEPH H. COULT, OF FAIRMONT, MINNESOTA, ASSIGNOR TO HOUGHTALING-COULT MANUFACTURING COMPANY, OF FAIRMONT, MINNESOTA, A CORPORATION OF MINNESOTA.

GRASS-CATCHER.

No. 921,804.      Specification of Letters Patent.      Patented May 18, 1909.

Application filed August 10, 1907. Serial No. 388,034.

*To all whom it may concern:*

Be it known that I, JOSEPH H. COULT, a resident of Fairmont, in the county of Martin and State of Minnesota, have invented certain new and useful Improvements in Grass-Catchers, of which the following is a full, clear, and exact description.

The invention relates to grass catchers for lawn-mowers.

The invention designs to provide a grass catcher of improved construction and which comprises a metallic bottom and fabric sides.

Another object of the invention is to provide an improved construction in which the sides of the receptacle are flared outwardly and upwardly to direct the grass which is frequently blown or thrown by knives in lateral direction.

The invention consists in the several novel features hereinafter set forth and more particularly defined by claims at the conclusion hereof.

In the drawings: Figure 1 is a perspective of the improved grass catcher. Fig. 2 is a view showing the improved catcher applied to a lawn mower of usual construction the catcher being shown in section and the mower being shown in elevation. Fig. 3 is a plan of the catcher and a portion of the mower handle. Fig. 3$^a$ is a detail perspective illustrating the manner of securing the stay-rod for one of the sides of the catcher to the metallic bottom. Fig. 3$^b$ is a detail of the lug for securing the front end of the catcher handle to the bottom of the receptacle.

The receptacle for catching the grass cut by the mower comprises a bottom 10 of sheet metal and sides 12 and a back 13 made of suitable fabric such as stout duck-cloth or canvas. The lower edge of the sides and back are secured to the metallic bottom by interfolding the overlapping edges of the metal and fabric respectively to form a seam or joint 14 which will securely connect the metallic bottom and the fabric sides. The upper edges of the fabric of the sides and back are stitched around a stay-rod or wire 16 which sustains the sides and back of the receptacle. The front ends of the wire 16 are extended downwardly to form legs or uprights which are connected to the bottom 10 by their terminals 16$^a$ which extend inwardly from the standards or legs and are pivotally held in seats or pockets in the receptacle-bottom which are formed by bending a portion 10$^a$ of the metallic bottom to form plates or seats for said terminals as clearly shown in Fig. 3$^a$. The lower ends of the standards or legs are disposed between the seams 14 and pockets 10$^a$ so that the sides and standards or legs are secured against outward movement from pockets 10$^a$. This construction serves to hold the uprights or legs of the stay-rod 16 so that the bottom and rod can be folded together for convenience in storage or packing and also serves to firmly hold the stay-rod in proper position laterally with respect to the bottom. The front portion of the sides 12 and the standards or legs of the stay-rod are flared outwardly, *i. e.*, the front edges thereof extend upwardly and outwardly at an obtuse angle from the receptacle-bottom to direct the grass blown laterally by the wind and discharged laterally by the knives into the receptacle. The connection between the standards or legs of the stay-rod and the bottom provides simple means for securing the front portion of the sides in spread relation, which is important because these sides direct much of the grass into the receptacle which would otherwise not be caught thereby.

A handle 20 for the receptacle has its front end secured to a staple or bracket 45 which is riveted to the receptacle bottom near the front edge thereof and is adapted to be secured to the handle by a screw 46 which extends through a hole in the handle. The rear portion of the handle is connected to the back of the receptacle in suitable manner, preferably by extending the stay-rod 16 through a hole therein. An advantage of this manner of attaching the handle to the receptacle is that it avoids the use of any cross connection between the receptacle-sides which may catch the grass when it is being discharged from the receptacle.

The pivotal connection 46 for the front end of the handle permits the handle to swing into substantially parallel relation with respect to the metallic bottom when the receptacle is folded. By extending rod 16 through the handle at the back of the catcher and connecting the front ends of the stay-rod to the bottom of the receptacle so the sides will be secured laterally, the catcher as a whole is rendered firm and strong. That portion of the handle between wire 16 and bracket 45 is convenient for use in carrying the laden receptacle either by grasping it in the hand or by placing it over the arm of the operator while carrying it away from the mower to be dumped. Receptacle-handle 20 is of sufficient length to be sustained by a depending support or hanger 40 which is pivotally connected to the handle or push bar 22 of the mower by a bolt 41. This support or hanger is provided with a plurality of holes 42 so it can be adjusted vertically to support the receptacle-handle and the rear portion of the catcher in desired elevation. Support or hanger 40 is provided with a plurality of seats in either of which the receptacle handle may be held to secure the rear end of the handle laterally.

A detachable connection for the front of the receptacle comprises a bail 24 adapted to be secured to the mower and comprises sides or ends 26 having holes or slots therein through each of which passes one of the bolts 28 which are those usually provided for connecting the roller 29 to the mower frame 30. Bolts 28 are adapted to securely clamp the bail to the sides of the mower frame to rigidly secure the bail thereto. The front edge of the sheet-metal bottom 10 is extended upwardly as at 32 to form a wall or ledge extending across the front of the receptacle and adapted to fit against an overlie bail 24 and then downwardly as at 33 to form a hook or detachable connection for the receptacle and bail which permits the receptable to be detached from the mower by lifting the hook off the bail. The lower edge-portion 33 is reverted, as at 34 to reinforce it. The bail is materially wider than the hook 33 at the front of the receptacle, and the front portion of the receptacle is materially wider than the knives and rollers 29 of the mower which are usually of substantially the same width. This construction and arrangement may be provided so the grass receptacle may be adjusted laterally at either side of the mower to receive all of the grass discharged backwardly and laterally from the mower at either side.

The invention provides an improved catcher receptacle which can be folded and produced at a low cost, and in which the receptacle sides are flared outwardly to direct the grass which is thrown or blown laterally as it is discharged from the mower.

The invention is not to be understood as restricted to precise details set forth since these may be modified by the skilled mechanic without departing from the spirit and scope of the invention.

Having thus described the invention, what I claim as new and desire to secure by Letters Patent, is:

1. In a grass catcher, the combination of a receptacle comprising a metallic bottom and fabric sides, a rod at the upper edge of said sides, standards secured to said rod and having laterally extending terminals at their lower ends, seats at the sides of the bottom in which said terminals are pivoted and held respectively, the front portions of said bottom being bent to form a hook, a handle for the receptacle and means for detachably connecting the receptacle to a mower.

2. In a grass-catcher, the combination of a receptacle comprising a metallic bottom and fabric sides, a bail adapted to be attached to a mower, a hook at the front of the bottom for detachably connecting the receptacle to said bail, standards having their lower ends pivoted to the bottom, and a handle for the receptacle.

3. In a grass catcher, the combination of a receptacle comprising a metallic bottom and fabric sides, a bail adapted to be secured to a mower, said bottom being bent to form a hook at its front for detachably connecting the receptacle to said bail, standards for said sides having their lower ends pivoted to the bottom at the sides of the bottom respectively, and disposed outwardly with respect to said hook, and a handle for the receptacle.

4. In a grass-catcher, the combination of a metallic bottom and fabric sides, a stay-rod at the upper edge of said sides, a handle secured to the rod at the back of the receptacle, means for pivotally connecting the front end of the handle to the front portion of the metallic bottom, and means for detachably connecting the receptacle to a mower.

5. In a grass-catcher, the combination of a receptacle comprising a metallic bottom and fabric sides, a stay-rod at the upper edge of said sides, uprights secured to said rod and having their lower ends pivotally secured to the bottom and secured laterally, a handle secured to the rod at the back of the receptacle, means for pivotally connecting the front end of the handle to the front portion of the metallic bottom, and means for detachably connecting the receptacle to a mower.

JOSEPH H. COULT.

Witnesses:
De Forrest Ward,
D. Follett.